US006752414B1

(12) United States Patent
Waldron et al.

(10) Patent No.: US 6,752,414 B1
(45) Date of Patent: Jun. 22, 2004

(54) COLLAPSIBLE WHEELCHAIR

(76) Inventors: Darcy Waldron, 10118-143 A St., Surry, British Columbia (CA), V3T 5A9; Shane Haggstrom, 16664-84$^{th}$ Ave., Surry, British Columbia (CA), V3T 5A9

( * ) Notice: Subject to any disclaimer, the term of this patent is extended or adjusted under 35 U.S.C. 154(b) by 103 days.

(21) Appl. No.: 10/140,725

(22) Filed: May 9, 2002

(51) Int. Cl.$^7$ .............................. B62B 7/06; A47C 4/28

(52) U.S. Cl. ....................... 280/649; 280/650; 280/657; 280/47.4; 297/16.2; 297/45

(58) Field of Search ................................ 280/647, 649, 280/650, 654, 657, 658, 47.25, 47.38, 47.4, 644; 297/16.2, 42, 45, 56

(56) References Cited

U.S. PATENT DOCUMENTS 2,722,972 A * 11/1955 Altruda ...................... 248/164
3,124,387 A * 3/1964 Mclaren .................... 297/16.2
3,604,750 A * 9/1971 Doering ...................... 297/467
3,995,882 A * 12/1976 Watkins ...................... 280/649
4,232,897 A * 11/1980 Maclaren et al. ............. 297/45
4,345,777 A * 8/1982 Perego ....................... 280/647
4,369,987 A * 1/1983 Witherell .................... 280/644
4,685,725 A * 8/1987 Helfrich ...................... 297/45
4,770,410 A * 9/1988 Brown ........................ 482/68
5,112,069 A * 5/1992 Aldus et al. .................. 280/42
5,358,263 A * 10/1994 Aldus et al. .................. 280/42
5,364,120 A * 11/1994 Shimansky ................. 280/650
5,741,020 A * 4/1998 Harroun ...................... 280/42
6,338,493 B1 * 1/2002 Wohlgemuth et al. ........ 280/30
6,402,230 B1 * 6/2002 Tang ......................... 297/16.2
6,499,804 B1 * 12/2002 Wu ............................ 297/381
6,505,885 B1 * 1/2003 Tang ......................... 297/16.2
6,601,912 B1 * 8/2003 Chen ........................... 297/45
6,604,750 B2 * 8/2003 Malassigne et al. ..... 280/250.1

* cited by examiner

*Primary Examiner*—Brian L. Johnson
*Assistant Examiner*—Bridget Avery

(57) ABSTRACT

A collapsible wheelchair for allowing a user to easily tote a wheelchair along on a public transportation such as an airplane and bus. The collapsible wheelchair includes a collapsible seat support assembly; wheel assemblies upon which the collapsible seat support assembly is mounted; brackets mounted to the collapsible seat support assembly; wheels rotatably mounted to the brackets; a seat member supported by the collapsible seat support assembly; footrest assemblies attached to the collapsible seat support assembly; handle members mounted to the collapsible seat support assembly; strap members attached to the seat member for securing a person upon the seat member; and a storage bag for storing the collapsible wheelchair.

6 Claims, 4 Drawing Sheets

COLLAPSIBLE WHEELCHAIR

BACKGROUND OF THE INVENTION

1. Field of the Invention

The present invention relates to foldable wheelchairs and more particularly pertains to a new collapsible wheelchair for allowing a user to easily tote one's wheelchair along on a public transportation such as an airplane and bus.

2. Description of the Prior Art

The use of foldable wheelchairs is known in the prior art. More specifically, foldable wheelchairs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,857,688; U.S. Pat. No. 5,669,619; U.S. Pat. No. 5,261,684; U.S. Pat. No. 5,568,933; U.S. Pat. No. Des. 360,172; and U.S. Pat. No. Des. 286,997.

While these devices fulfill their respective, particular objectives and requirements, the aforementioned patents do not disclose a new collapsible wheelchair. The prior art describes inventions having frames, wheels mounted to the frames, seat members mounted upon the frames, and handles for moving the wheelchairs.

SUMMARY OF THE INVENTION

The general purpose of the present invention, which will be described subsequently in greater detail, is to provide a new collapsible wheelchair which has many of the advantages of the foldable wheelchairs mentioned heretofore and many novel features that result in a new collapsible wheelchair which is not anticipated, rendered obvious, suggested, or even implied by any of the prior art foldable wheelchairs, either alone or in any combination thereof. The present invention includes a collapsible seat support assembly; and further includes wheel assemblies upon which the collapsible seat support assembly is mounted and including brackets being mounted to the collapsible seat support assembly and wheels being; rotatably mounted to the brackets; and also includes seat member being supported by the collapsible seat support assembly; and further includes footrest assemblies being attached to the collapsible seat support assembly; and also includes handle members being mounted to the collapsible seat support assembly; and further includes strap members being attached to the seat member for securing a person upon the seat member; and also includes a storage bag for storing the collapsible wheelchair. None of the prior art describes the brace locking assemblies of the present invention.

There has thus been outlined, rather broadly, the more important features of the collapsible wheelchair in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new collapsible wheelchair which has many of the advantages of the foldable wheelchairs mentioned heretofore and many novel features that result in a new collapsible wheelchair which is not anticipated, rendered obvious, suggested, or even implied by any of the prior art foldable wheelchairs, either alone or in any combination thereof.

Still another object of the present invention is to provide a new collapsible wheelchair for allowing a user to easily tote one's wheelchair along on a public transportation such as an airplane and bus.

Still yet another object of the present invention is to provide a new collapsible wheelchair that can be easily and conveniently set up and taken down in a matter of minutes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
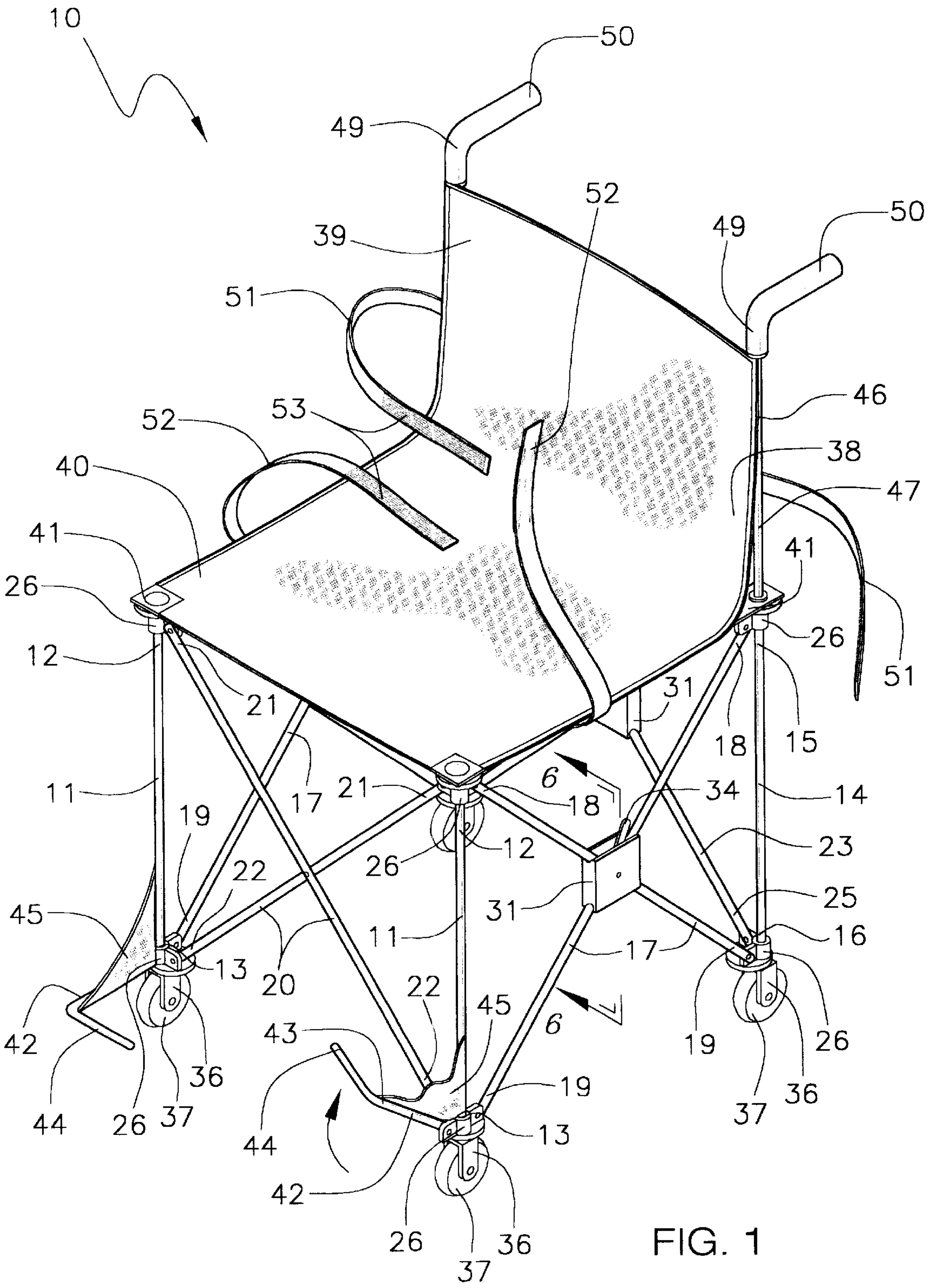
FIG. 1 is a front perspective view of a new collapsible wheelchair according to the present invention.
Figure 2:
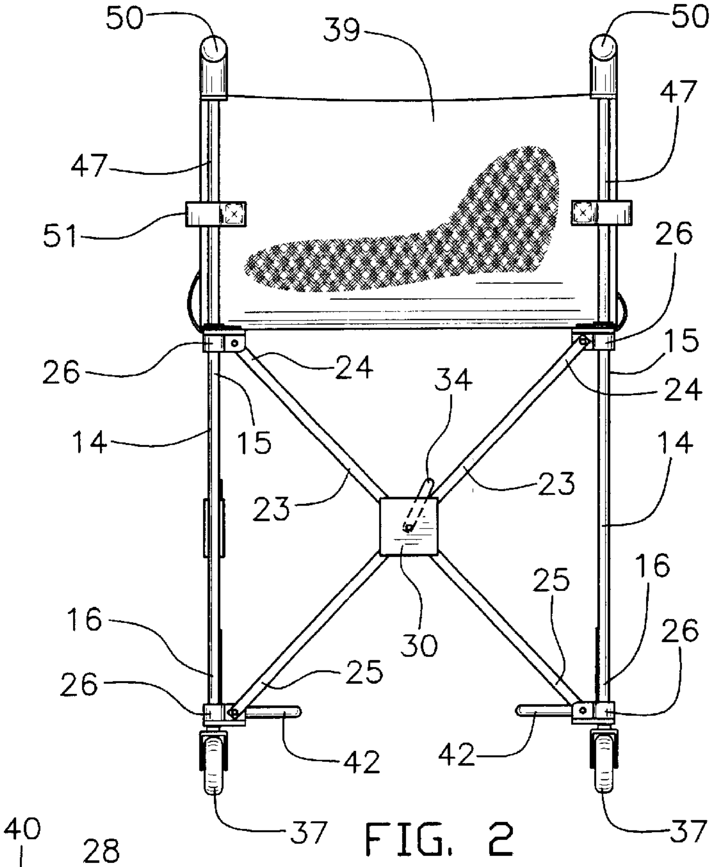
FIG. 2 is a rear elevational view of the present invention.
Figure 3:
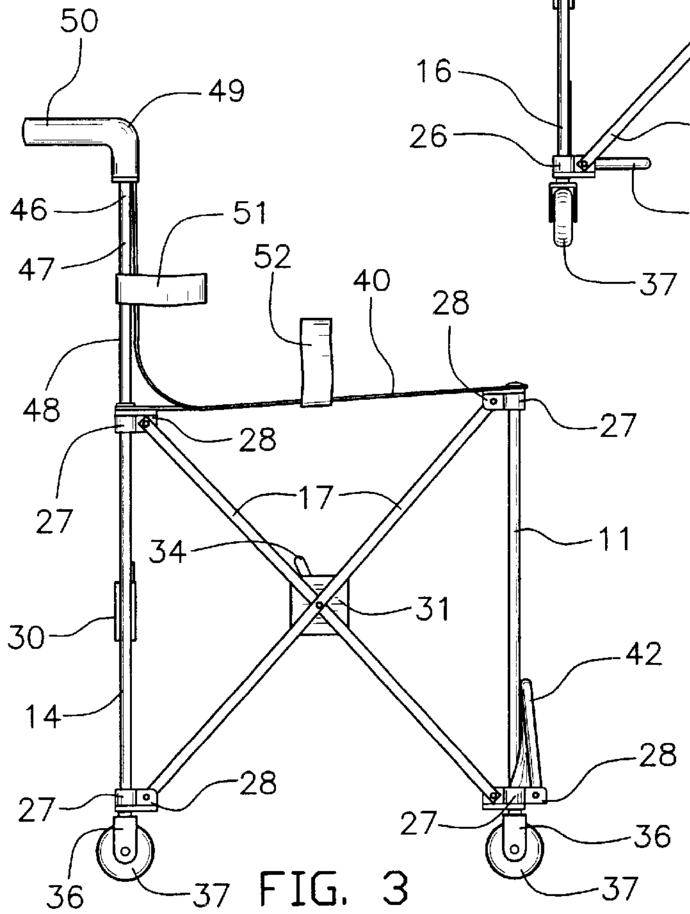
FIG. 3 is a side elevational view of the present invention.
Figure 4:
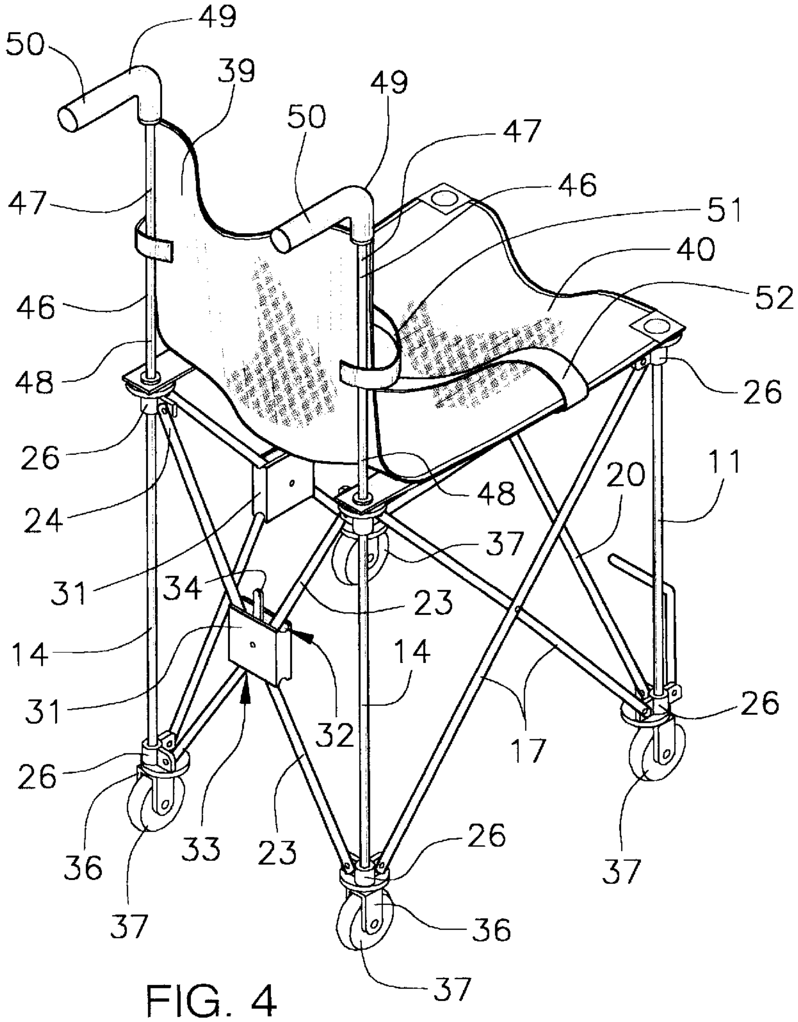
FIG. 4 is a rear perspective view of the present invention.
Figure 5:
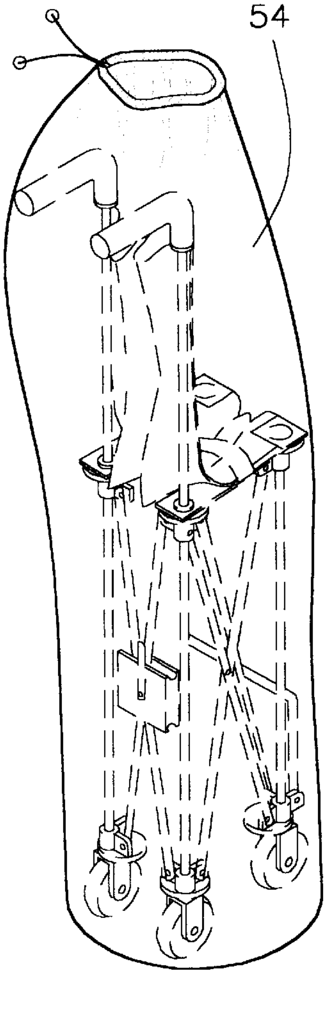
FIG. 5 is a perspective view of a storage bag of the present invention.
Figure 6:
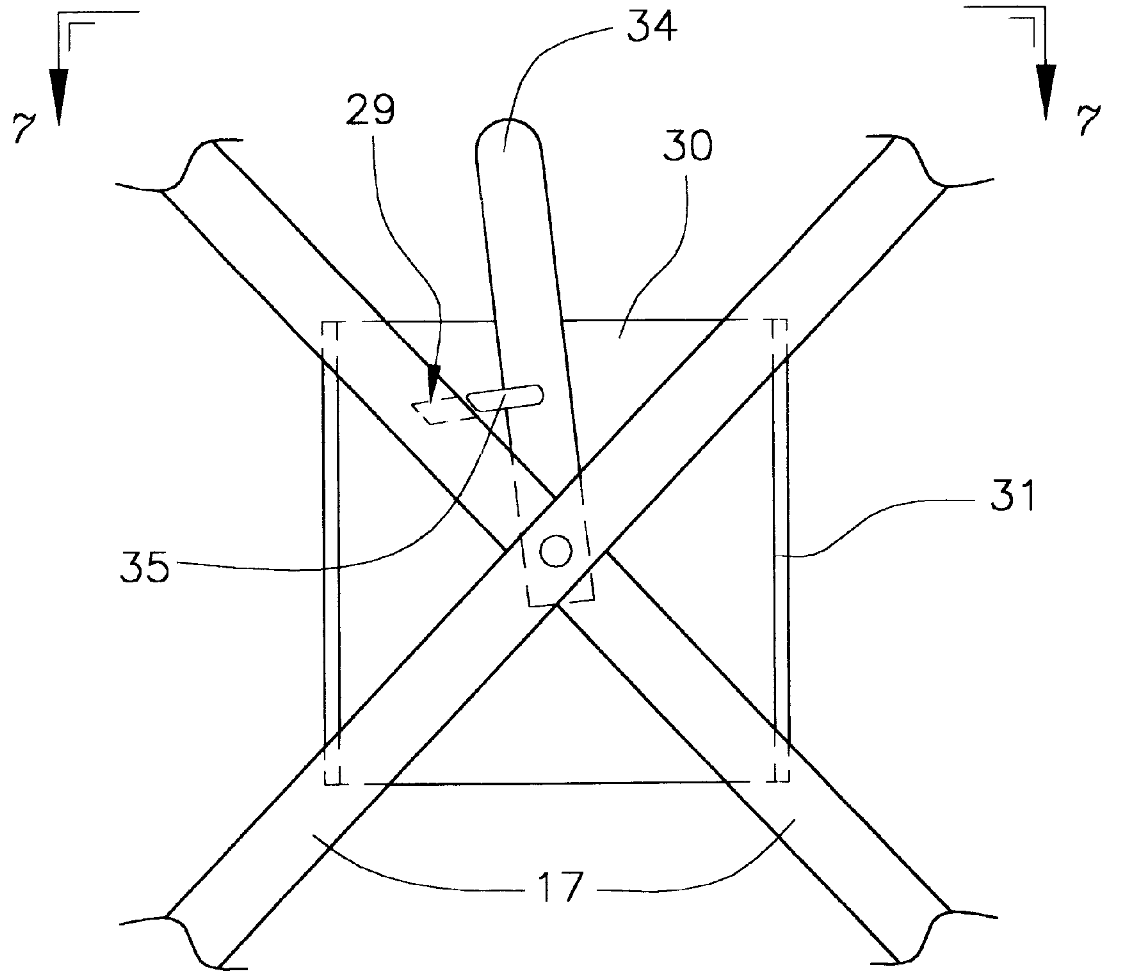
FIG. 6 is a detailed cross-sectional view of one of leg fastening assemblies of the present invention.
Figure 7:
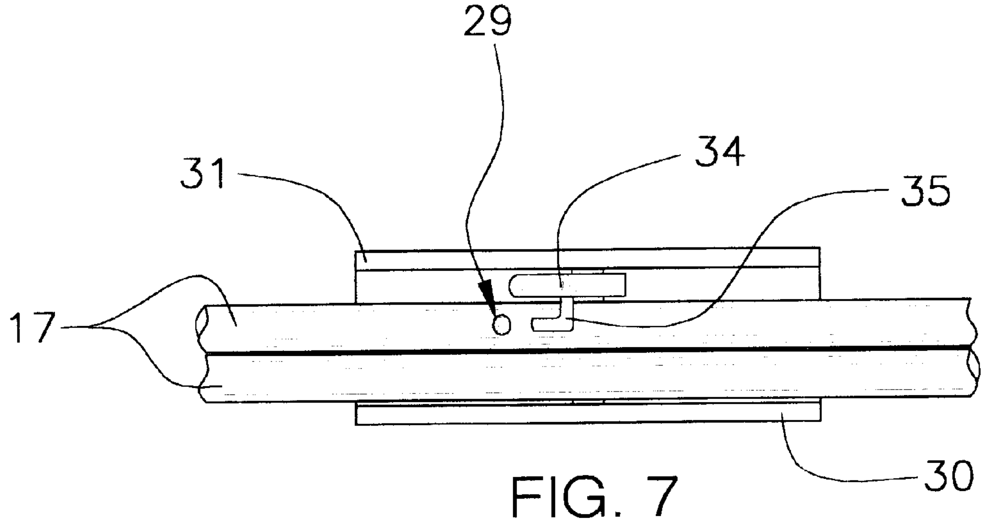
FIG. 7 is a top plan view of one of the leg fastening assemblies of the present invention.

With reference now to the drawings, and in particular to FIGS. 1 through 7 thereof, a new collapsible wheelchair embodying the principles and concepts of the present invention and generally designated by the reference numeral 10 will be described.

As best illustrated in FIGS. 1 through 7, the collapsible wheelchair 10 generally comprises a collapsible seat support assembly. The collapsible seat support assembly includes leg members 11,14 having top ends 12,15 and bottom ends 13,16, and also includes seat support members 41 being conventionally mounted at the top ends 12,15 of the leg members 11,14, and further includes a plurality of elongate brace members 17,20,23 conventionally interconnecting the leg members 11,14, and also includes brace locking assemblies 30 being conventionally mounted to a plurality of the elongate brace members 17,23, and further includes bracket members 26 for fastening the elongate brace members 17,20,23 to the leg members 11,14. The leg members 11,14 include a pair of front leg members 11 and a pair of rear leg members 14. The bracket members 26 are securely and conventionally mounted at the top ends 12,15 and the bottom ends 13,16 of the leg members 11,14. Each of the bracket members 26 includes a sleeve 27 being conventionally mounted about a respective top and bottom end of a respective leg member 11,14, and also includes grommets 28 being conventionally attached and welded to and extending outwardly of the sleeve 27. The elongate brace members 17,20,23 include front 20, side 17, and rear pairs 20 of the elongate brace members; wherein the elongate brace members 17,20,23 of a respective pair of the elongate brace members 17,20,23 being pivotally and centrally attached with fasteners to one another. The front pair of the elongate brace members 20 has top ends 21 which are fastened to the grommets 28 at the top ends 12 of the front leg members 11, and also has bottom ends 22 which are fastened to the grommets 28 at the bottom ends 13 of the front leg members 11. Each of the side pairs of the elongate brace members 17 includes one of the elongate brace members having a top end 18 which is fastened to the grommet 28 at the top end 12 of a respective front leg member 11 and also having a bottom end 19 which is fastened to the grommet 28 at the bottom end 16 of a respective rear leg member 14, and also includes another of the elongate brace members 17 having a top end 18 which is fastened to the grommet 28 at the top end 15 of a respective rear leg member 14 and also having a bottom end 19 which is fastened to the grommet 28 at the bottom end 13 of a respective top leg member 11. One of the elongate brace members 17 of one of the side pairs of the elongate brace members has a slot 29 being disposed therein near a center thereof. The rear pair of the elongate brace members 23 has top ends 24 which are fastened to the grommets 28 at the top ends 15 of the rear leg members 14, and also has bottom ends 25 which are fastened to the grommets 28 at the bottom ends 16 of the rear leg members 14. One of the elongate brace members 23 of the rear pair of the elongate brace members has a slot 29 being disposed therein near a center thereof. The brace locking assemblies 30 are conventionally attached to one of the side pairs of the elongate brace members 17, and are also conventionally attached to the rear pair of the elongate brace members 23. Each of the brace locking assemblies 30 includes a housing 31 having open top and bottom ends 32,33 with the elongate brace members 17,23 extending through the open top and bottom ends 32,33 of the housing 31, and also includes a lever 34 having an end being pivotally and conventionally mounted in the housing 31, and further includes a latch pin 35 being conventionally attached to the lever 34 and extending outwardly therefrom and being removably received in the slot 29 of a respective elongate brace member 17,23 for keeping the elongate brace members 17,20,23 spread apart in a non-collapsible position.

Wheel assemblies upon which the collapsible seat support assembly is mounted includes brackets 36 being conventionally mounted to the collapsible seat support assembly and also includes wheels 37 being conventionally rotatably mounted to the brackets 36. The brackets 36 of the wheel assemblies are conventionally mounted to the bottom ends 13,16 of the leg members 11,14.

A seat member 38 being supported by the collapsible seat support assembly includes a sheet of material having a backrest portion 39 and a seat portion 40 being conventionally attached to the seat support members 41. Footrest assemblies are conventionally attached to the collapsible seat support assembly. The footrest assemblies are pivotally attached at the bottom ends 13 of the front leg members 11. Each of the footrest assemblies includes an elongate footrest member 42 having an end which is pivotally attached to a respective front leg member 11, and also includes a piece of material 45 being conventionally attached to the elongate footrest member 42 and to a respective front leg member 11. The elongate footrest member 42 includes a first portion 43 and a second portion 44 which is angled relative to the first portion 43.

Handle members 46 are conventionally mounted to the collapsible seat support assembly. The handle members 46 include elongate shafts 47 having bottom portions 48 which are conventionally mounted upon the rear leg members 14 and extend upwardly therefrom, and also have top portions 49 which are angled relative to the bottom portions 48 thereof, and also include handgrip members 50 being conventionally mounted upon the top portions 49 of the elongate shafts 47. The backrest portion of the seat member is conventionally attached to the bottom portions 48 Strap members 51,52 are conventionally attached to the seat member 38 for securing a person upon the seat member 38. The strap members 51,52 include pairs of the strap members with one of the pairs of the strap members 51 being conventionally attached to the backrest portion 39 of the seat member 38 and with another of the pairs of the strap members 52 being conventionally attached to the seat portion 40 of the seat member 38. The strap members 51,52 have strips of hook and loop fasteners 53 securely and conventionally attached at ends thereof for fastening the strap members 51,52 together. A storage bag 54 is provided for storing the collapsible wheelchair therein.

In use, the user pivots the levers 34 so that the latch pins 35 are inserted in the slots 29 of the respective elongate brace members 17,23 to set up the wheelchair 10 in a functional position. When the wheelchair 10 is not needed, the user simply pivots the levers 34 to remove the latch pins 35 from the slots 29 so that the elongate brace members 17,20,23 can be pivoted to collapse the wheelchair 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the collapsible wheelchair. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A collapsible wheelchair comprising:

a collapsible seat support assembly, said collapsible seat support assembly including leg members having top ends and bottom ends, and also including seat support members being mounted at said top ends of said leg members, and further including a plurality of elongate brace members interconnecting said leg members, and also including brace fastening assemblies being mounted to a plurality of said elongate brace members, and further including bracket members for fastening said elongate brace members to said leg members, said leg members including a pair of front leg members and a pair of rear leg members, said bracket members being securely mounted at said top ends and said bottom ends of said leg members, each of said bracket members including a sleeve being mounted about a respective said end of a respective said leg member, and also including grommets being attached to and extending outwardly of said sleeve, said elongate brace members including front, side, and rear pairs of said elongate brace members; wherein said elongate brace members of a respective said pair of said elongate brace members being pivotally and centrally attached to one another;

wheel assemblies upon which said collapsible seat support assembly is mounted and including brackets being mounted to said collapsible seat support assembly and wheels being rotatably mounted to said brackets;

a seat member being supported by said collapsible seat support assembly;

footrest assemblies being attached to said collapsible seat support assembly;

handle members being mounted to said collapsible seat support assembly;

strap members being attached to said seat member for securing a person upon said seat member; and a storage bag for storing said collapsible wheelchair.

2. A collapsible wheelchair as described in claim 1, wherein said front pair of said elongate brace members has top ends which are fastened to said grommets at said top ends of said front leg members and also having bottom ends which are fastened to said grommets at said bottom ends of said front leg members.

3. A collapsible wheelchair as described in claim 1, wherein each of said side pairs of said elongate brace members includes one of said elongate brace members having a top end which is fastened to said grommet at said top end of a respective said front leg member and also having a bottom end which is fastened to said grommet at said bottom end of a respective said rear leg member, and also includes another of said elongate brace members having a top end which is fastened to said grommet at said top end of a respective said rear leg member and also having a bottom end which is fastened to said grommet at said bottom end of a respective said top leg member, one of said elongate brace members of one of said side pairs of said elongate brace members having a slot being disposed therein near a center thereof.

4. A collapsible wheelchair as described in claim 1, wherein said rear pair of said elongate brace members has top ends which are fastened to said grommets at said top ends of said rear leg members and also having bottom ends which are fastened to said grommets at said bottom ends of said rear leg members, one of said elongate brace members of said rear pair of said elongate brace members having a slot being disposed therein near a center thereof.

5. A collapsible wheelchair as described in claim 1, wherein said brace fastening assemblies are attached to one of said side pairs of said elongate brace members, and are also attached to said rear pair of said elongate brace members.

6. A collapsible wheelchair as described in claim 5, wherein each of said brace fastening assemblies includes a housing having open top and bottom ends with said elongate brace members extending through said open top and bottom ends of said housing, and also includes a lever having an end pivotally mounted in said housing, and further includes a latch pin being attached to said lever and extending outwardly therefrom and being removably received in said slot of a respective said elongate brace member for keeping said elongate brace members spread apart in a non-collapsible position.

* * * * *